(12) United States Patent
Sweeney et al.

(10) Patent No.: US 9,882,766 B2
(45) Date of Patent: Jan. 30, 2018

(54) SYSTEM AND METHOD FOR ACCESS CONTROL LIST CONVERSION

(71) Applicants: Adam James Sweeney, San Jose, CA (US); Asang Kamalakar Dani, Nagpur (IN)

(72) Inventors: Adam James Sweeney, San Jose, CA (US); Asang Kamalakar Dani, Nagpur (IN)

(73) Assignee: Arista Networks, Inc., Santa Clara, CA (US)

( * ) Notice: Subject to any disclaimer, the term of this patent is extended or adjusted under 35 U.S.C. 154(b) by 863 days.

(21) Appl. No.: 13/852,863

(22) Filed: Mar. 28, 2013

(65) Prior Publication Data

US 2014/0244840 A1 Aug. 28, 2014

Related U.S. Application Data

(60) Provisional application No. 61/771,004, filed on Feb. 28, 2013.

(51) Int. Cl.
| | |
|---|---|
| *G06F 15/173* | (2006.01) |
| *G06F 15/16* | (2006.01) |
| *H04L 29/08* | (2006.01) |
| *H04L 29/06* | (2006.01) |
| *H04L 12/741* | (2013.01) |

(52) U.S. Cl.
CPC ...... *H04L 29/08027* (2013.01); *H04L 45/745* (2013.01); *H04L 63/0263* (2013.01); *H04L 63/101* (2013.01)

(58) Field of Classification Search
CPC ............. H04L 29/08027; H04L 45/745; H04L 63/101; H04L 63/0263

USPC .................................................. 709/223–225
See application file for complete search history.

(56) References Cited

U.S. PATENT DOCUMENTS

| | | | |
|---|---|---|---|
| 8,700,771 B1 * | 4/2014 | Ramankutty | H04L 63/101 |
| | | | 370/389 |
| 2001/0011259 A1 * | 8/2001 | Howard | G06K 9/626 |
| | | | 706/25 |
| 2006/0184492 A1 * | 8/2006 | Long | G06N 5/025 |
| | | | 706/47 |

(Continued)

*Primary Examiner* — Minh-Chau Nguyen
(74) *Attorney, Agent, or Firm* — Blakely Sokoloff Taylor & Zafman LLP (57) ABSTRACT

A method and apparatus of a device that converts an ordered ACL to an unordered ACL is described. In an exemplary embodiment, a network element receives an ordered access control list that includes a set of ordered rules, where each of the ordered rules includes an address range and an action. Furthermore, if two address ranges for two of the ordered rules overlap, a corresponding action of a preceding rule overrules a corresponding action of a subsequent rule for an overlapping range of addresses. The network element further converts the ordered access control list to an unordered access control list, where the unordered access control list includes a plurality of independent rules and each of the plurality of independent rules include a corresponding address range that is non-overlapping with other address ranges of the plurality of independent rules. In addition, the network element stores the unordered access control list, where the unordered access control list is used by the network element to make forwarding decisions for processing network data.

15 Claims, 7 Drawing Sheets

(56) References Cited

U.S. PATENT DOCUMENTS

| | | | |
|---|---|---|---|
| 2007/0143851 A1* | 6/2007 | Nicodemus | G06F 21/55 726/25 |
| 2010/0175124 A1* | 7/2010 | Miranda | H04L 63/0263 726/13 |
| 2010/0274584 A1* | 10/2010 | Kim | G06F 19/322 705/3 |
| 2010/0299741 A1* | 11/2010 | Harrison | H04L 63/0281 726/12 |
| 2011/0060713 A1* | 3/2011 | Harrison | G06F 21/604 706/47 |
| 2011/0283348 A1* | 11/2011 | Ling | H04L 63/0263 726/11 |
| 2013/0301641 A1* | 11/2013 | Anand | H04L 63/0227 370/389 |

* cited by examiner

SYSTEM AND METHOD FOR ACCESS CONTROL LIST CONVERSION

RELATED APPLICATIONS

Applicant claims the benefit of priority of prior, provisional application Ser. No. 61/771,004, filed Feb. 28, 2013, the entirety of which is incorporated by reference.

FIELD OF INVENTION

This invention relates generally to data networking and more particularly to converting an ordered access control list of permit and deny rules to an unordered access control list of permit or deny rules.

BACKGROUND OF THE INVENTION

An Access Control List (ACL) consists of an ordered series of rules, where each rule has a match criterion and an action. An ACL is applied to a piece of data by evaluating the data against these rules in order and taking the action of the first rule that matched. For example, a match criterion for each rule is a pair (V, M), where V is a numeric value up to N bits long and M is a mask of N 0 and 1 bits. A value X matches the rule if (X & M)==(V & M), where "&" is the bitwise "logical and" operator.

In one example, the values (X) matched against an ACL are Internet Protocol (IP) v4 or IPv6 addresses. In this example, the (V, M) pairs match subsets of the IPv4 or IPv6 address space, and the actions of an ACL are either "permit" or "deny". Also, each ACL is terminated by an "implicit deny" rule at the end equivalent to "deny (0, 0)," which denies every address that is not explicitly covered by another preceding rule in the ACL.

In addition, because the ACL is ordered, preceding rules in the ACL can overrule some or all of a subsequent rule for overlapping ranges of addresses. For example, if the ordered rules are "permit 128.1.1.0/24, permit 128.1.2.0/24, and deny 128.1.0.0/20," because the permit rules are ordered higher in the ACL, the permit rules overrule the overlapping address ranges of the deny rule. As a result, the addresses are permitted by this ACL are "128.1.1.0-128.1.2.255" and the addresses denied are "128.1.0.0-128.1.0.255" and "128.1.3.0-128.1.255.255". A problem with an ordered ACL is that the ACL can includes hundreds or thousands of rules and evaluating this ACL can require complicated hardware resources of the network element.

SUMMARY OF THE DESCRIPTION

A method and apparatus of a device that converts an ordered ACL to an unordered ACL is described. In an exemplary embodiment, a device receives an ordered access control list that includes a set of ordered rules, where each of the ordered rules includes an address range and an action. Furthermore, if two address ranges for two of the ordered rules overlap, a corresponding action of a preceding rule overrules a corresponding action of a subsequent rule for the overlapping range of addresses. The device further converts the ordered access control list to an unordered access control list, where the unordered access control list includes a plurality of independent rules and each of the plurality of independent rules include a corresponding address range that is non-overlapping with other address ranges of the plurality of independent rules. In addition, the device stores the unordered access control list, where the unordered access control list is used by a network element to make forwarding decisions for processing network data.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a device that converts an ordered ACL to an unordered ACL is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that converts an ordered access control list (ACL) to an unordered ACL is described. In one embodiment, an ordered ACL is an ordered series of rules, where each rule includes a match criterion of an address range and an action (e.g., permit or deny). If an address matches the address range, the action of the rule is applied to a packet with that matching address. In the ordered ACL, the ordered series of rules are ordered in the sense that a preceding rule overrules a subsequent rule for an overlapping address range between the two rules. The device further converts the ordered ACL to an unordered ACL. An unordered ACL is an ACL with a series of independent rules. Each of the independent rules includes match criterion of an address range and an action (e.g., permit or deny) similar to the ordered rules. If an address matches the address range, the action of the rule is applied to a packet with that matching address. However, each of the address ranges in the independent rules is non-overlapping with other address ranges of the independent rules. In one embodiment, the rules are independent, because these rules can be applied in any order and the same result would apply. In addition and in one embodiment, each of the independent rules has the same action (e.g., permit or deny).

In one embodiment, the device converts the unordered ACL to an ordered ACL by initializing a potentially permitted set of addresses to be all addresses in the address range and the actually permitted set of addresses to be empty. The potentially permitted set of addresses is a set of address ranges, with each address range defined by a starting value and an ending value. The potentially permitted set is the remaining set of address ranges that have not yet been permitted or denied by the ACL being converted. The actually permitted set of addresses is another set of address ranges, with each address range also defined by a starting value and an ending value. The actually permitted set is the set of address ranges that have been permitted so far by the ACL being permitted. The device further processes each rule in the ordered ACL. If the ordered rule is a deny rule, the device removes the range covered by the rule from the potentially permitted set. If the ordered rule is a permit, the device adds the overlapping portions of any ranges in the potentially permitted set to the actually permitted set and removes those overlapping portions from the potentially permitted set. In this embodiment, the address ranges in the actually permitted set at the end of processing of the ordered rules is an unordered set of permitted address ranges. This set can be further converted to a set of non-overlapping deny address ranges.

Figure 1:
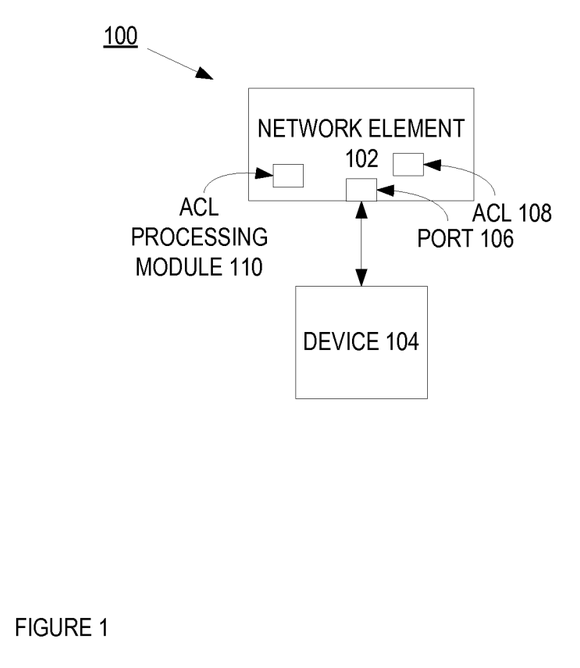
FIG. 1 is a block diagram of one embodiment of a network element that is coupled to a device and uses an Access Control List (ACL) for the port that couples the device and the network element.

FIG. 1 is a block diagram of one embodiment of a network element 102 that is coupled to a device 104 and uses an Access Control List (ACL) 108 for the port 106 that couples the device 104 and the network element 102. In FIG. 1, the system 100 includes the network element 102 that is coupled to the device 104. In one embodiment, the network element 102 is a device that provides network access to a network (e.g., physical network, virtualized network, etc.). A network element can be a switch, router, hub, bridge, gateway, etc., or any type of device that can allow access to a network. In one embodiment, the network element 102 can be a virtual machine. In one embodiment, the device 104 is any type of device that can communicate network data with another device (e.g., a personal computer, laptop, server, mobile device (e.g., phone, smartphone, personal gaming device, etc.), another network element, etc.). In one embodiment, the device 104 can be a virtual machine or can be a device that hosts one or more virtual machines.

In one embodiment, the network element 102 communicates network data with the device 104 via the port 106 using the ACL 108. In addition, the network element 102 includes an ACL processing module 110 that converts an ordered ACL to an unordered ACL. In one embodiment, an ordered ACL 108 can consist of an ordered series of rules, with each rule having a match criterion and an action. An ACL is applied to a piece of data by evaluating the data against the rules in order and taking the action of the rule that matched. The match criterion for each rule is a pair (V, M), where V is a numeric value up to N bits long and M is a mask of N 0 and 1 bits. A value X matches the rule if (X & M)==(V & M), where "&" is the bitwise "logical and" operator. In one embodiment, the values (X) matched against an ACL are Internet Protocol (IP) v4 or IPv6 addresses. The address can be a source or destination address. In one embodiment, the (V, M) pairs match subsets of the IPv4 or IPv6 address space and the actions of an ACL are either a "permit" or a "deny". In one embodiment, an ACL can be terminated by an "implicit deny" rule at the end equivalent to "deny (0, 0)".

In one embodiment, the ACL is an ordered list and means that a preceding rule in the ACL takes precedence over a subsequent rule. With an ordered ACL having possibly hundreds of ordered rules, evaluating the rules for an address for each packet can require expensive hardware. For example and in one embodiment, a network element can include a ternary content addressable memory (TCAM) that is used to evaluate the ordered rules. In one embodiment, the ACL processing module 110 converts an arbitrary ACL of mixed permit rules, deny rules, and the implicit deny rule into a functionally equivalent unordered list of only permit rules or an unordered list of only deny rules. Allowing the rules to be unordered increases the flexibility that the system has in choosing the structure used to evaluate the ACL during packet processing. In one embodiment, evaluating the unordered rules scales as O ln(n) and can be performed in hardware or software. For example and in one embodiment, each of the unordered rules is an address range that are either a permit or a deny action. A tree of these address ranges can be constructed where the network element can traverse the tree for each packet address using a tree search algorithm (e.g., Patricia trie, radix trie, M-trie, etc.). Thus, in one embodiment, a TCAM hardware based approach of evaluating an ACL for each packet address can be replaced by a software/hardware-based approach of a tree search. While in one embodiment, the network element 102 performs the ACL conversion, in alternate embodiments, the ACL conversion is performed by another device (e.g., a network management station (NMS), a software defined network controller, or another device in the network). In the alternate embodiment, the device converts the ACL to an unordered ACL and sends the unordered ACL to the network element 102.

Figure 2:
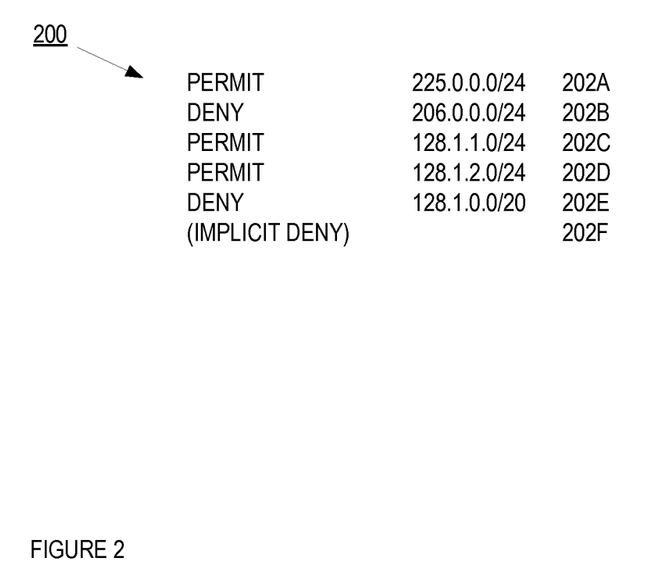
FIG. 2 is an illustration of one embodiment of an ordered ACL, where the ACL includes permit and deny rules.

FIG. 2 is an illustration of one embodiment of an ordered ACL 200, where the ACL includes permit and deny rules 202A-F. In FIG. 2, the ordered ACL includes rules 202A-F, where rule 202A is the highest precedence and is a permit for the pair (225.0.0.0, 24). In this embodiment, the range of addresses from 225.0.0.0 to 225.0.0.255 is permitted through this port and packets with addresses in this range are further processed by the network element (e.g., forwarded, or some other type of network processing). In addition, this rule 202A is the highest precedence and overrules a subsequent rule. The next highest precedent rule is rule 202B and is a deny for the pair (206.0.0.0, 24). This rule 202B denies addresses in the range of 206.0.0.0-206.0.0.255. The next two rules 202C-D are permits for the address range pairs (128.1.1.0, 24) and (128.1.2.0, 24), respectively. In one embodiment, these rules overrule a range of address from the next rule 202E, which is a deny for the pair (128.1.0.0, 20). The result of rules 202C-E permits address ranges 128.1.1.0-128.1.2.255 and denies for the address ranges 128.1.0.0-128.1.0.255 and 128.1.3.0-128.1.255.255. Furthermore, there is an implicit deny rule 202F that denies all other address that are not accounted for in a preceding rules 202A-E.

In one embodiment, this ordered ACL 200 can be difficult to implement in hardware because specialized hardware for evaluating the ordered ACL may be required (e.g., a TCAM). In addition, the rules in the ACL 200 must be applied in the order defined in ordered list, otherwise a different result may be found. In another embodiment, the ordered ACL 200 can be converted to an unordered ACL, in which the different rules in the ACL are not dependent on each other and can be applied in any order, achieving the same result. In one embodiment, an unordered ACL is a list of non-overlapping rules that is either all permits or all denies. In this embodiment, the hardware requirements for an unordered ACL are less than for an ordered ACL. In one embodiment, finding if there is a match of an address in an unordered ACL is finding if an address is in one of the ranges of the ACL. If the address is found, the corresponding action of the unordered ACL is applied (e.g., permit or deny). If not, the default action is performed (e.g., deny or permit). Finding an address can be implanted in hardware or software using a method to find a value in a list of value ranges (e.g., Patricia trie, radix trie, M-trie, etc.).

Figure 3:
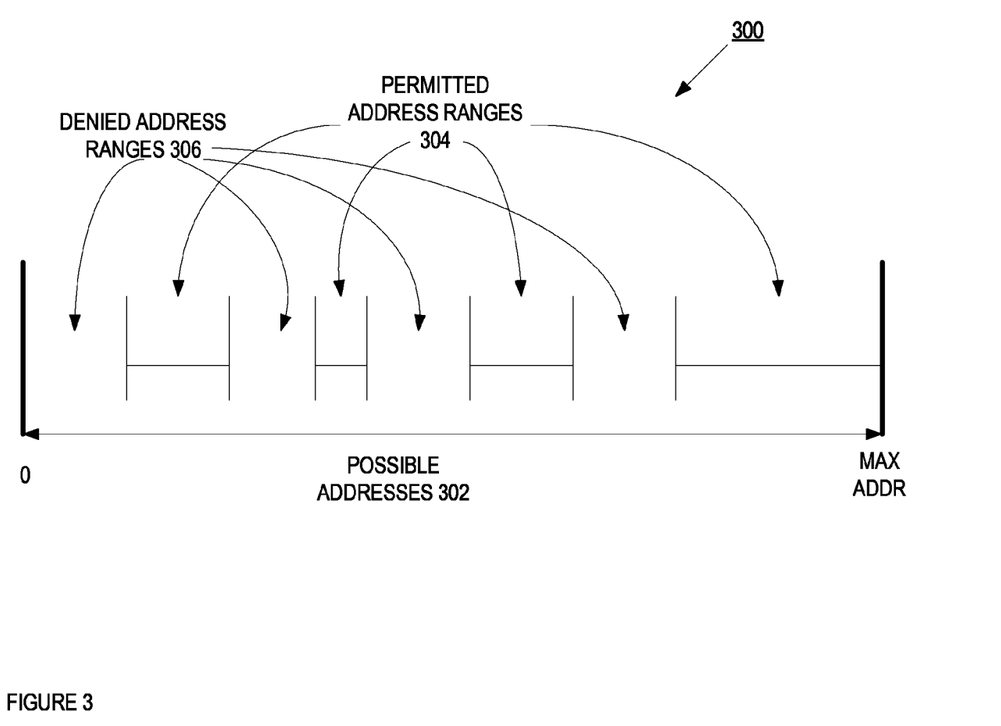
FIG. 3 is an illustration of one embodiment of a range of possible addresses, where the possible addresses includes denied address ranges and permitted address ranges.

FIG. 3 is an illustration of one embodiment of a range of possible addresses 302, where the possible addresses includes denied address ranges 306 and permitted address ranges 304. In FIG. 3, the range of possible addresses 302 ranges from zero to a maximum address. For example and in one embodiment, the address range for IPv4 addresses is $2^{32}$ and for IPv6 addresses is $2^{128}$. In one embodiment, the range of possible addresses is partitioned into denied address ranges 306 and permitted address ranges 304. In one embodiment, either the denied address ranges 306 or the permitted address ranges 304 can be used for the basis of the unordered ACL.

Figure 4:
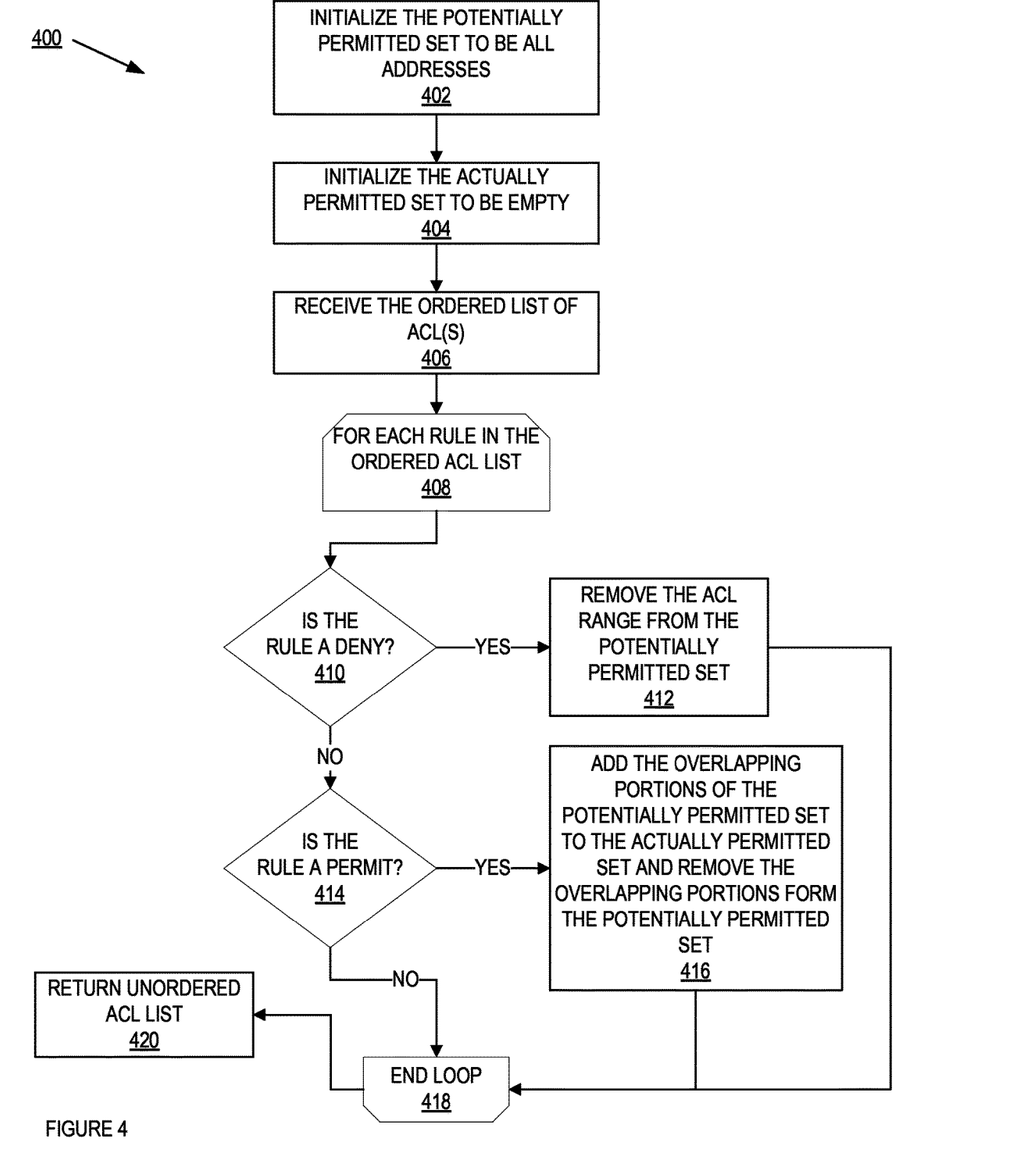
FIG. 4 is a flow diagram of one embodiment of a process to convert an ordered ACL to an unordered ACL.

In one embodiment, the ACL processing module 110 of the network element 102 converts an ordered ACL of permits and denies to an unordered ACL that is either permits or denies. In this embodiment, the ACL processing module 110 creates sets of permitted address ranges from a set of possibly permitted address. FIG. 4 is a flow diagram of one embodiment of a process 400 to convert an ordered ACL to an unordered ACL. In one embodiment, process 400 is performed by an ACL processing module, such as the ACL processing module 110 as described in FIG. 1 above. In FIG. 4, process 400 begins by initializing the potentially permitted set of addresses to be all the possible addresses at block 402. In one embodiment, the set of potentially permitted addresses is a set of ranges of values, with each address range defined by a starting value and an ending value. The potentially permitted set is the remaining set of value ranges that have not yet been permitted or denied by the ACL being converted. At block 404, process 400 initializes the actually permitted set of addresses to be empty. In one embodiment, the actually permitted set of addresses is a set of ranges of values, with each address range defined by a starting value and an ending value. The actually permitted set is the set of value ranges that have been permitted so far by the ACL being permitted.

At block 406, process 400 receives the ordered ACL. In one embodiment, the ordered ACL is an ordered list of deny and permitted rules, in which a preceding rule takes precedence over a subsequent rule. For example and in one embodiment, the ordered ACL is the ACL 300 as described in FIG. 3 above. Process 400 performs a processing loop (blocks 408-418) to walk through the ordered ACL to convert each individual rule. At block 410, process 400 determines if that rule is a deny rule. In one embodiment, a deny rule is a rule that denies a packet with an address from further processing by the network element, when the packet address is in the range defined in the deny rule. In one embodiment, the network element drops that packet if the packet address matches the deny rule. For example and in one embodiment, if the deny rule has a range pair of (206.0.0.0, 24), this will deny packets with addresses in the range of 206.0.0.0-206.0.0.255. The address can be a source or destination address, depending on if this rule is used for source or destination addresses (or both). If the rule is a deny rule, process 400 removes the address range from the potentially permitted set at block 412. In one embodiment, by removing this address range from the potentially permitted addresses, process 400 removes these addresses from being permitted by a subsequent rule. For example and in one embodiment, if the deny rule has a range pair of (206.0.0.0, 24), process 400 will remove the address range of 206.0.0.0-206.0.0.255 from the potentially permitted set of addresses. In one embodiment, if some or all of the addresses are not in the potentially permitted set of addresses, process 400 ignores the missing addresses and removes the other addresses, as the missing addresses were removed from a preceding permit or deny rule. Execution proceeds to block 418 below. If the rule is not a deny rule, execution proceeds to block 414 below.

At block 414, process 400 determines if the rule is a permit rule. In one embodiment, a permit rule is a rule that permits a packet to be further processed by the network element with an address that is in the range defined in the permit rule. For example and in one embodiment, if the permit rule has a range pair of (225.0.0.0, 24), this rule will permit packets with addresses in the range of 225.0.0.0-225.0.0.255 to be further processed by the network element (e.g., forward, apply QoS or traffic shaping, and/or another network processing function). The address can be a source or destination address, depending on if this rule is used for source or destination addresses (or both). If the rule is a permit rule, process 400 adds the overlapping portions of any ranges in the potentially permitted set to the actually permitted set and removes those overlapping portions from the potentially permitted set at block 416. For example and in one embodiment, if permit rule is "permit 128.1.0.0/20," and the overlapping address range covered by the permit rule in the potentially permitted set is 128.1.1.0-128.1.1.255, process 400 removes this range from the potentially permitted set and adds the same range to the actually permitted set. By adding these overlapping ranges to the actually permitted set of addresses, process 400 is building the set of permitted address ranges in the actually permitted set. Execution proceeds to block 418 below. If the rule is not a permit rule, execution proceeds to block 418 below. The processing loop ends at block 418 below.

Process 400 returns the unordered ACL at block 420. In one embodiment, if the unordered ACL is to be expressed as a set of permitted address ranges, the unordered ACL is the actually permitted set of addresses that was computed using processing loop of blocks 408-418. In another embodiment, if the unordered ACL is to be expressed as a set of denied address ranges, process 400 computes the unordered ACL from the actually permitted set of addressed. For example and in one embodiment, process 400 determines the complimentary sets of address ranges from the actually permitted set of addresses and uses these complimentary sets of address ranges as the unordered ACL. Process 400 can sort the ranges in the actually permitted set into a list and generate entries for the gaps at the start of the list, between each pair of entries in the list, and at the end of the list. In one embodiment, process 400 converts each of the address ranges to be returned into a set of address, mask pairs. For example and in one embodiment, process 400 converts the address ranges into a (V, M) pair.

Figure 5:
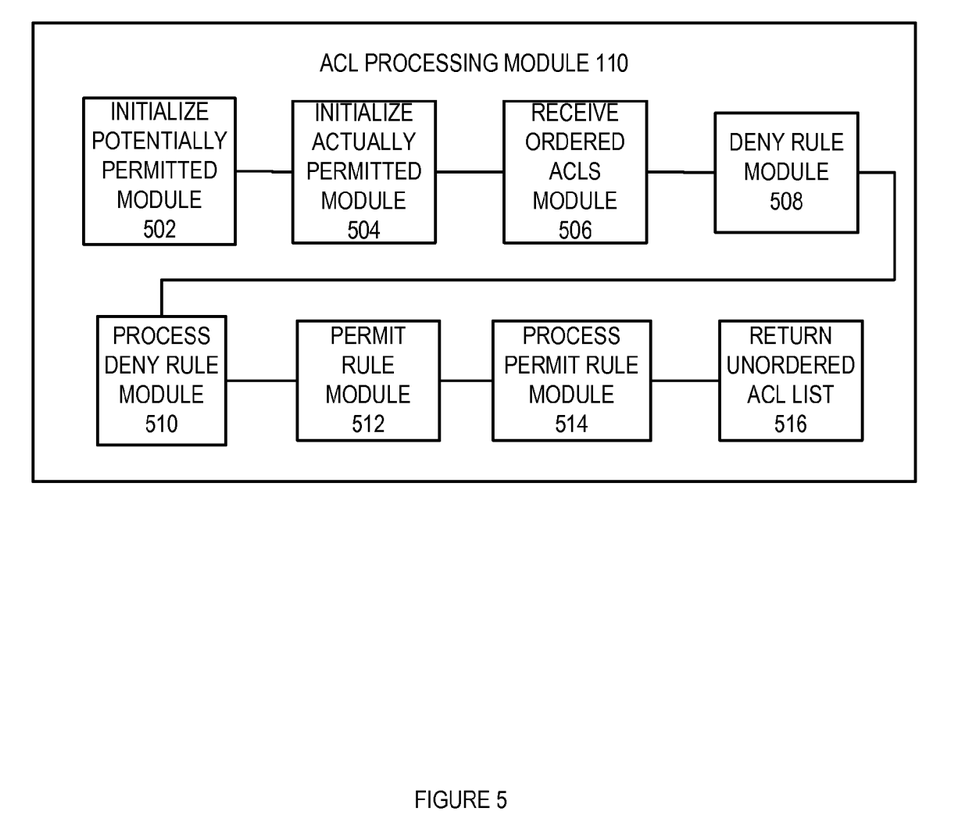
FIG. 5 is a block diagram of an ACL processing module that converts an ordered ACL to an unordered ACL.

FIG. 5 is a block diagram of an ACL processing module 110 that converts an ordered ACL to an unordered ACL. In one embodiment, the ACL processing module 110 includes an initialize potentially permitted module 502, initialize actually permitted module 504, receive ordered ACL module 506, deny rule module 508, process deny rule module 510, permit rule module 512, process permit rule 514, and return unordered ACL list 516. In one embodiment, the initialize potentially permitted module 502 initializes the potentially permitted set of addresses as described at block 402 in FIG. 4 above. The initialize actually permitted module 504 initializes the actually permitted set of addresses as described at block 404 in FIG. 4 above. The receive ordered ACL module 506 receives the ordered ACL as described at block 406 in FIG. 4 above. The deny rule module 508 determines if the rule is a deny rule as described at block 410 in FIG. 4 above. The process deny rule module 510 processes the deny rule as described at block 412 in FIG. 4 above. The permit rule module 512 determines if the rule is a permit rule as described at block 414 in FIG. 4 above. The process permit rule 514 processes the permit rule as described at block 402 in FIG. 4 above. The return unordered ACL list 516 returns the unordered ACL as described at block 420 in FIG. 4 above.

Figure 6:
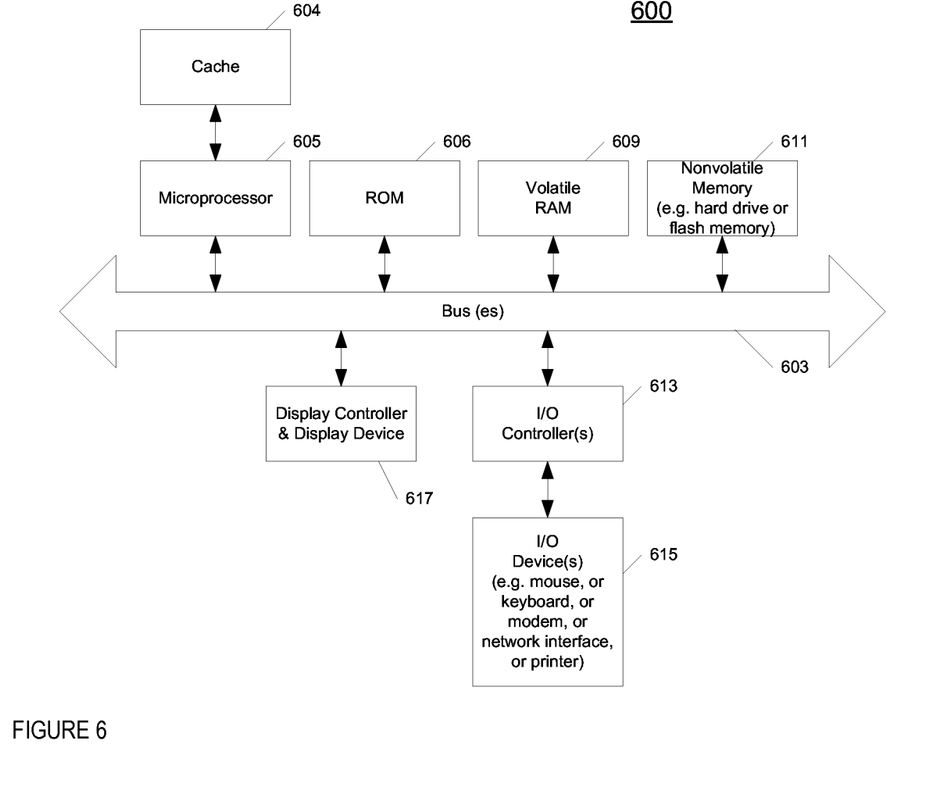
FIG. 6 illustrates one example of a typical computer system, which may be used in conjunction with the embodiments described herein.

FIG. 6 shows one example of a data processing system 600, which may be used with one embodiment of the present invention. For example, the system 600 may be implemented including a network element 102 as shown in FIG. 1. Note that while FIG. 6 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 6, the computer system 600, which is a form of a data processing system, includes a bus 603 which is coupled to a microprocessor(s) 605 and a ROM (Read Only Memory) 607 and volatile RAM 609 and a non-volatile memory 611. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 615 and to peripheral devices such as input/output (I/O) devices which may be mice, keyboards, modems, network interfaces, printers and other devices which are well known in the art. In one embodiment, the system 600 includes a plurality of network interfaces of the same or different type (e.g., Ethernet copper interface, Ethernet fiber interfaces, wireless, and/or other types of network interfaces). In this embodiment, the system 600 can include a forwarding engine to forward network date received on one interface out another interface.

Typically, the input/output devices 615 are coupled to the system through input/output controllers 617. The volatile RAM (Random Access Memory) 609 is typically implemented as dynamic RAM (DRAM), which requires power continually in order to refresh or maintain the data in the memory.

The mass storage 611 is typically a magnetic hard drive or a magnetic optical drive or an optical drive or a DVD RAM or a flash memory or other types of memory systems, which maintain data (e.g. large amounts of data) even after power is removed from the system. Typically, the mass storage 611 will also be a random access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 603 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 7:
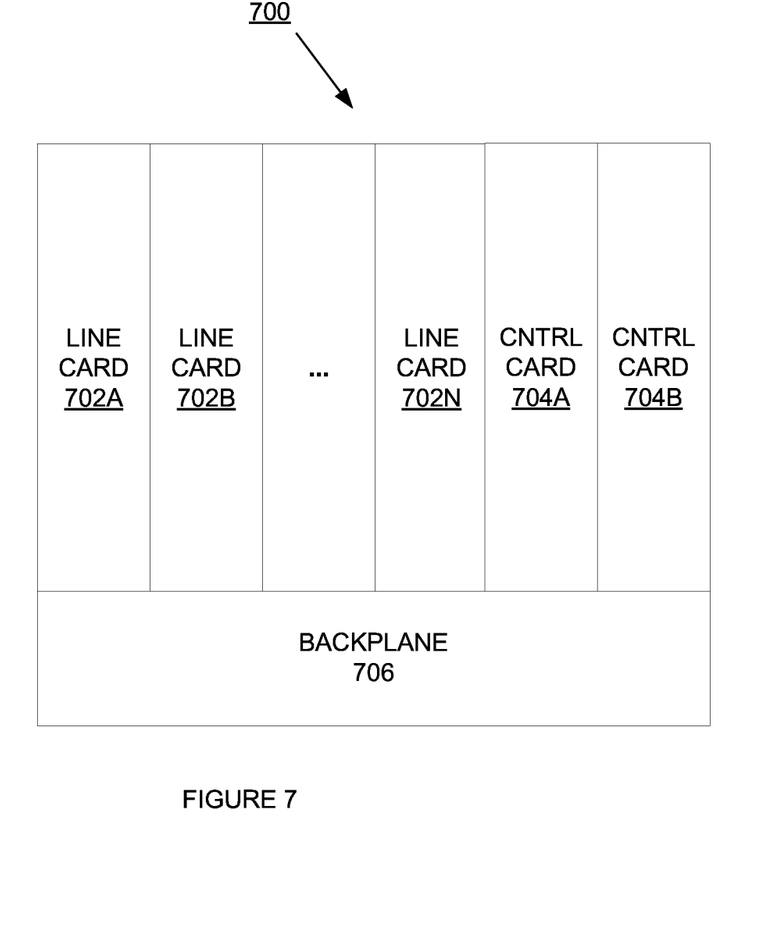
FIG. 7 is a block diagram of one embodiment of an exemplary network element that converts an ordered ACL to an unordered ACL.

FIG. 7 is a block diagram of one embodiment of an exemplary network element 700 that converts an ordered ACL to an unordered ACL. In FIG. 7, the backplane 706 couples to the line cards 702A-N and controller cards 704A-B. While in one embodiment, the controller cards 704A-B control the processing of the traffic by the line cards 702A-N, in alternate embodiments, the controller cards 704A-B, perform the same and/or different functions (e.g., converting the ordered ACL to the unordered ACL, etc.). In one embodiment, the line cards 702A-N process and forward traffic according to the network policies received from controller cards the 704A-B. In one embodiment, the controller cards 704A-B converts the ACL and uses the ACL on one or more of the ports of one of the line cards 702A-N as described in FIG. 4. In this embodiment, one or both of the controller cards includes the ACL processing module to convert an ordered ACL to an unordered ACL, such as the ACL processing module 110 as described in FIG. 1 above. In another embodiment, the line cards 702A-N converts the ACL and uses the ACL on one or more of the ports of the respective line card 702A-N that does the ACL conversion as described in FIG. 4. It should be understood that the architecture of the network element 700 illustrated in FIG. 7 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "converting," "receiving," "determining," "transmitting," "sending," "forwarding," "storing," "adding," "returning," "communicating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to convert an ordered access control list to an unordered access control list, the method comprising:
   receiving an ordered access control list of ordered rules, wherein each of the ordered rules includes an address range and an action, an address range includes a starting address and a range, and, if two address ranges in the ordered rules overlap, a corresponding action of a preceding rule of the ordered rules overrides a corresponding action of a subsequent rule of the ordered rules for an overlapping range of addresses;
   converting the ordered access control list to the unordered access control list, wherein the unordered access control lists includes a plurality of independent rules and each of the plurality of independent rules include a corresponding address range that is non-overlapping with other address ranges of the plurality of independent rules, wherein the converting includes,
      for each of the plurality of ordered rules in the ordered access control list,
         removing a deny address range of that deny rule from a set of potentially permitted addresses if the ordered rule is a deny rule, and
         adding an overlapping portion between a permit address range of that permit rule and a potentially permitted set of addresses to a set of actually permitted addresses, if that ordered rule is a permit rule, and
      generating the plurality of independent rules for the unordered access list from the set of actually permitted addresses; and
   storing the unordered access control list in the memory of the network element, wherein the unordered access control list is used by a network element to make forwarding decisions for processing network data and the ordered access control list of ordered rules and the unordered access control list achieve the same result for the network data.

2. The non-transitory machine-readable medium of claim 1, wherein the each of the plurality of independent rules is selected from the group consisting of a permit rule and a deny rule.

3. The non-transitory machine-readable medium of claim 2, wherein a permit rule includes a range of addresses that are allowed to be forwarded by a network element.

4. The non-transitory machine-readable medium of claim 2, wherein a deny rule includes a range of addresses that are dropped by a network element.

5. The non-transitory machine-readable medium of claim 1, wherein an address of an address range is selected from the group consisting of an Internet Protocol v4 address and an Internet Protocol v6 address.

6. The non-transitory machine-readable medium of claim 1, further comprising:
returning the set of actually permitted addresses, wherein the set of actually permitted addresses includes the unordered access control list.

7. The machine-readable medium of claim 1, wherein the set of potentially permitted addresses initially includes the set of all possible addresses and the set of actually permitted initially is the empty set.

8. A method to convert an ordered access control list to an unordered access control list, the method comprising:
receiving an ordered access control list of ordered rules, wherein each of the ordered rules includes an address range and an action, an address range includes a starting address and a range, and, if two address ranges in the ordered rules overlap, a corresponding action of a preceding rule of the ordered rules overrides a corresponding action of a subsequent rule of the ordered rules for an overlapping range of addresses;
converting, with a processor, the ordered access control list to the unordered access control list, wherein the unordered access control lists includes a plurality of independent rules and each of the plurality of independent rules include a corresponding address range that is non-overlapping with other address ranges of the plurality of independent rules, wherein the converting includes,
for each of the plurality of ordered rules in the ordered access control list,
removing a deny address range of that deny rule from a set of potentially permitted addresses if the ordered rule is a deny rule, and
adding an overlapping portion between a permit address range of that permit rule and the potentially permitted set of addresses to a set of actually permitted addresses, if that ordered rule is a permit rule, and
generating the plurality of independent rules for the unordered access list from the set of actually permitted addresses; and
storing the unordered access control list in the memory of the network element, wherein the unordered access control list is used by a network element to make forwarding decisions for processing network data and the ordered access control list of ordered rules and the unordered access control list achieve the same result for the network data.

9. The method of claim 8, wherein the each of the plurality of independent rules is selected from the group consisting of a permit rule and a deny rule.

10. The method of claim 9, wherein a permit rule includes a range of addresses that are allowed to be forwarded by a network element.

11. The method of claim 9, wherein a deny rule includes a range of addresses that are dropped by a network element.

12. The method of claim 8, wherein an address of an address range is selected from the group consisting of an Internet Protocol v4 address and an Internet Protocol v6 address.

13. The method of claim 10, further comprising:
returning the set of actually permitted addresses, wherein the set of actually permitted addresses includes the unordered access control list.

14. A device to convert an ordered access control list to an unordered access control list, the apparatus comprising:
a processor;
a memory coupled to the processor though a bus; and
a process executed from the memory by the processor to cause the processor to receive an ordered access control list of ordered rules, wherein each of the ordered rules includes an address range and an action and, if two address ranges in the ordered rules overlap, a corresponding action of a preceding rule of the ordered rules overrides a corresponding action of a subsequent rule of the ordered rules for an overlapping range of addresses, convert the ordered access control list to the unordered access control list, wherein the unordered access control lists includes a plurality of independent rules and each of the plurality of independent rules include a corresponding address range that is non-overlapping with other address ranges of the plurality of independent rules, and store the unordered access control list, wherein the unordered access control list is used by a network element to make forwarding decisions for processing network data, the process further causes the processor to convert the ordered access control list by, for each of the plurality of ordered rules in the ordered access control list, removing a deny address range of that deny rule from a set of potentially permitted addresses if the ordered rule is a deny rule, and adding an overlapping portion between a permit address range of that permit rule and the potentially permitted set of addresses to a set of actually permitted addresses, if that ordered rule is a permit rule, and generate the plurality of independent rules for the unordered access list from the set of actually permitted addresses, and the process further causes the processor to store the unordered access control list in the memory of the network element, wherein the unordered access control list is used by a network element to make forwarding decisions for processing network data and the ordered access control list of ordered rules and the unordered access control list achieve the same result for the network data.

15. The device of claim 14, wherein the each of the plurality of independent rules is selected from the group consisting of a permit rule and a deny rule.

* * * * *